United States Patent

Tillen et al.

[11] 3,994,596
[45] Nov. 30, 1976

[54] AUXILIARY DEVICE FOR STRAIN DETECTORS

[75] Inventors: Ronald J. Tillen, Thompson, Conn.; Donald E. Everburg, Southbridge, Mass.

[73] Assignee: American Optical Corporation, Southbridge, Mass.

[22] Filed: Apr. 2, 1975

[21] Appl. No.: 564,513

[52] U.S. Cl. .............................. 356/246; 211/133
[51] Int. Cl.² ......................................... G01N 1/00
[58] Field of Search ................. 356/30, 32, 33, 35, 356/114, 246; 350/95; 73/88 A; 250/428; 248/148; 23/291, 292; D7/27, 70; D9/184, 187, 242; 211/133, 162; 297/182

[56] References Cited
UNITED STATES PATENTS

| | | | |
|---|---|---|---|
| 803,102 | 10/1905 | Harris | 211/162 |
| 2,869,417 | 1/1959 | Allen | 356/30 |
| 3,725,004 | 4/1973 | Johnson et al. | 23/292 |
| 3,768,710 | 10/1973 | Eggers | 211/133 |
| 3,938,961 | 2/1976 | Lanier | 23/292 |
| D224,928 | 10/1972 | Wiley | D9/187 |

FOREIGN PATENTS OR APPLICATIONS

| | | | |
|---|---|---|---|
| 429,659 | 7/1967 | Switzerland | 211/162 |

*Primary Examiner*—Edward S. Bauer
*Assistant Examiner*—Wm. H. Punter
*Attorney, Agent, or Firm*—H. R. Berkenstock, Jr.; William C. Nealon

[57] ABSTRACT

The strengthening of a glass ophthalmic lens by ion exchange treatment does not alter the appearance of the lens sufficiently to render the presence or absence of such strengthening readily visually ascertainable even with the aid of a light polarizing strain detector. It being desirable to inspect for the presence or absence of strengthening by ion exchange treatment prior to dispensing glass lenses to the public, the present invention provides an auxiliary device for a light polarizing strain detector with which a lens to be inspected may be immersed in a liquid having approximately the same refractive index as the lens so that the strain detector can produce readily perceivable stress patterns in strengthened lenses.

9 Claims, 7 Drawing Figures

AUXILIARY DEVICE FOR STRAIN DETECTORS

BACKGROUND OF THE INVENTION

1. Field of the Invention

This invention relates to the inspection of glass articles for the detection of stress in surfaces thereof and is more particularly concerned with an auxiliary device which is adaptable to a light polarizing strain detector for facilitating inspection of glass ophthalmic lenses for the presence or absence of stress patterns resulting from ion exchange treatment.

2. Discussion of the Prior Art

In order to enhance the impact resistance of glass ophthalmic lenses so as to safeguard against injury to the eyes of a wearer and yet not require the lenses to be excessively thick, heavy and/or otherwise ungainly, it has become customary to treat the surfaces of these lenses in such manner as to induce a surface compressive stress therein. This may be accomplished by thermal tempering or chemical ion exchange treatment.

Thermally tempered glass is produced by rapidly cooling a glass piece which has been heated to near the softening point. This produces a compressive stress on the surface of the article while the interior of the article is under tensile stress.

Glass articles which have been strengthened by ion exchange treatment become compressively stressed by the substitution of a larger monovalent alkali metal ion for a smaller monovalent alkali metal ion in the surface of the glass article causing its surface to become more densely packed than its interior.

The terms "surfacse treatment", "surface treated" and variations thereof as used in this specification and its appended claims are intended to include all surface layers which may be used to strengthen the subject articles, regardless of the precise method by which such layers are formed. Layers of stress are herein considered as being surface treated layers whether produced by thermal tempering, chemical ion exchange, or otherwise.

Since neither of the aforesaid methods of surface treatment alter the appearance of the treated article (e.g. an ophthalmic lens) sufficiently so that the presence or absence of treatment may be readily ascertained visually and there is the need to determine the presence or absence of treatment, industry has heretofore been obliged to invest in complex and expensive inspection apparatuses or systems particularly when inspecting for the presence or absence of the more difficult to detect surface stresses produced by chemical treatment (ion exchange).

The present invention overcomes the need for complex and expensive testing apparatuses and has as a principal objective the provision of a simple and inexpensive but efficient auxiliary device for conventional light polarizing strain detectors which can render such detectors suitable for use in inspecting for the presence or absence of thin layers of stress in ophthalmic lenses which have been strengthened not only by heat treatment but more particularly those strengthened by the more difficult to detect ion exchange treatment.

SUMMARY OF THE INVENTION

The present invention accomplishes the foregoing objective and its corollaries by the provision of a special container for liquid which, as an auxiliary device, can be quickly, simply and securely adapted to a conventional light polarizing strain detector in the path of light between its two light polarizing elements. The device is at all times readily removable from the strain detector to free the detector for conventional usage.

The container is provided with a bottom window of transparent material which is substantially free of stress or strain and is otherwise so sufficiently optically inactive as to permit light to pass therethrough without appreciable, if any, diffusion or diffraction. Having a normally open top, the container has its sidewalls and remaining portions preferably formed of an opaque or minimally light transmissive material. A dust cover may be provided for the top, if desired.

With the auxiliary device installed, at least a portion of a glass lens to be inspected is immersed in a liquid provided in the container and linearly polarized light is caused to pass through the container, the liquid and the immersed portion of the lens. Viewing the immersed portion of the lens with the thus modified strain detector will provide an observer with indication of whether the lens has been strengthened by chemical ion exchange treatment, or otherwise, as follows:

Chemical ion exchange treatment produces a thin layer of compression in the rim of a lens so treated leaving the rim (e.g. a beveled lens edge) birefringent with respect to light transmitted therethrough. With the portion of the lens being observed immersed in a liquid of matching or approximately the same refractive index as that of the lens material, prism power, light scattering (diffusion) and/or depolarization by asperities of the lens edge are effectively cancelled out by the immersion liquid. Thus, a disturbance of polarized light passing through the lens edge caused by tangential surface compression (e.g. strengthening by ion exchange treatment) can be independently observed in the strain detector as one or more brightly illuminated bands of light extending about the lens edge.

In the case of a lens strengthened by thermal tempering, the usual strain pattern of a Maltese cross, or portion thereof, will be observed. Absence of either the bright bands of light or the Maltese cross pattern will indicate a lack of surface stress (strengthening) in the observed lens.

The auxiliary device is additionally provided with a peripherally disposed integral drip or splash catcher for avoiding undue contamination of the strain detector and/or its immediate environment.

Details of the invention will become more readily apparent from the following description taken in conjunction with the accompanying drawings.

DESCRIPTION OF THE PREFERRED EMBODIMENTS

Figure 1:
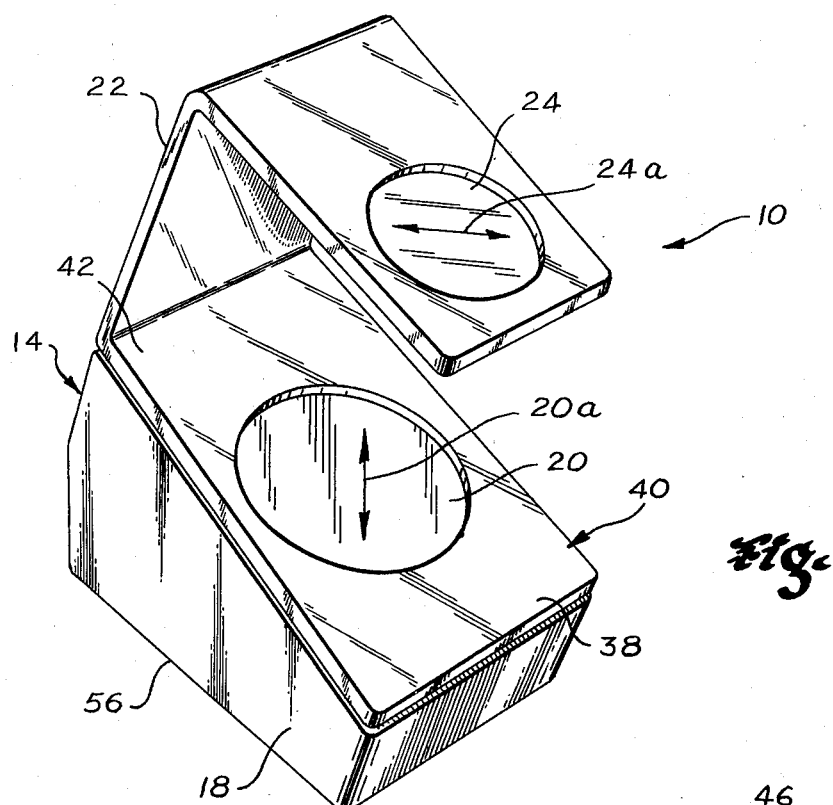
FIG. 1 is a view, in perspective, of an exemplary commercially available light polarizing strain detector to which the auxiliary device of the present invention is applicable.
Figure 2:
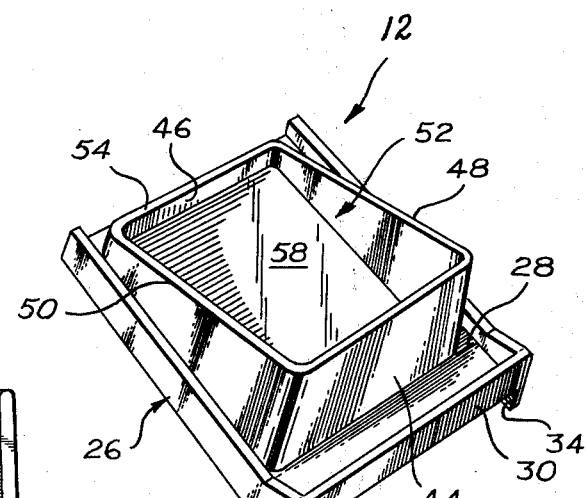
FIG. 2 is a view, in perspective, of a preferred embodiment of the invention.
Figure 3:
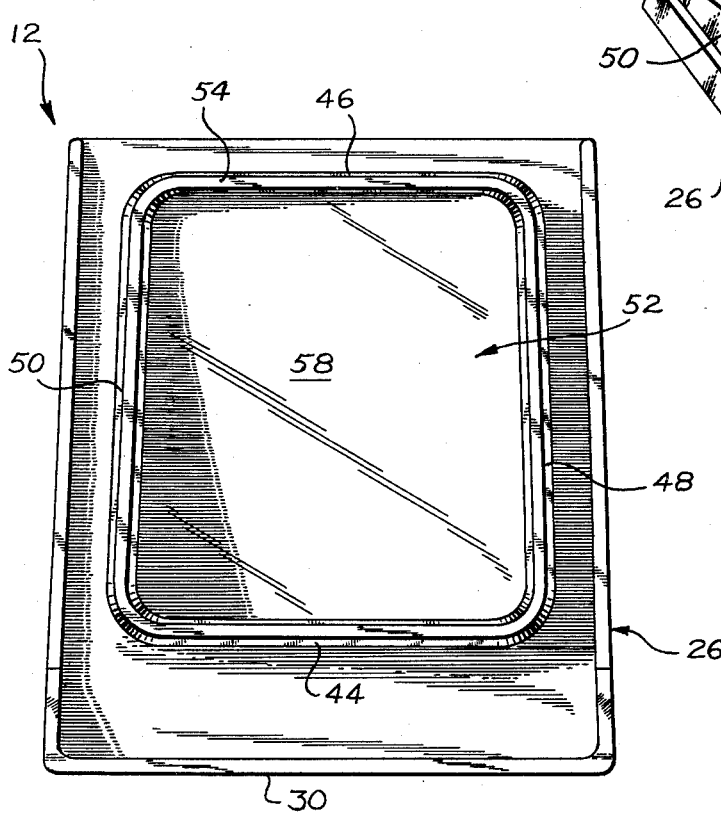
FIG. 3 is a top plan view of the auxiliary device of FIG. 2.
Figure 4:
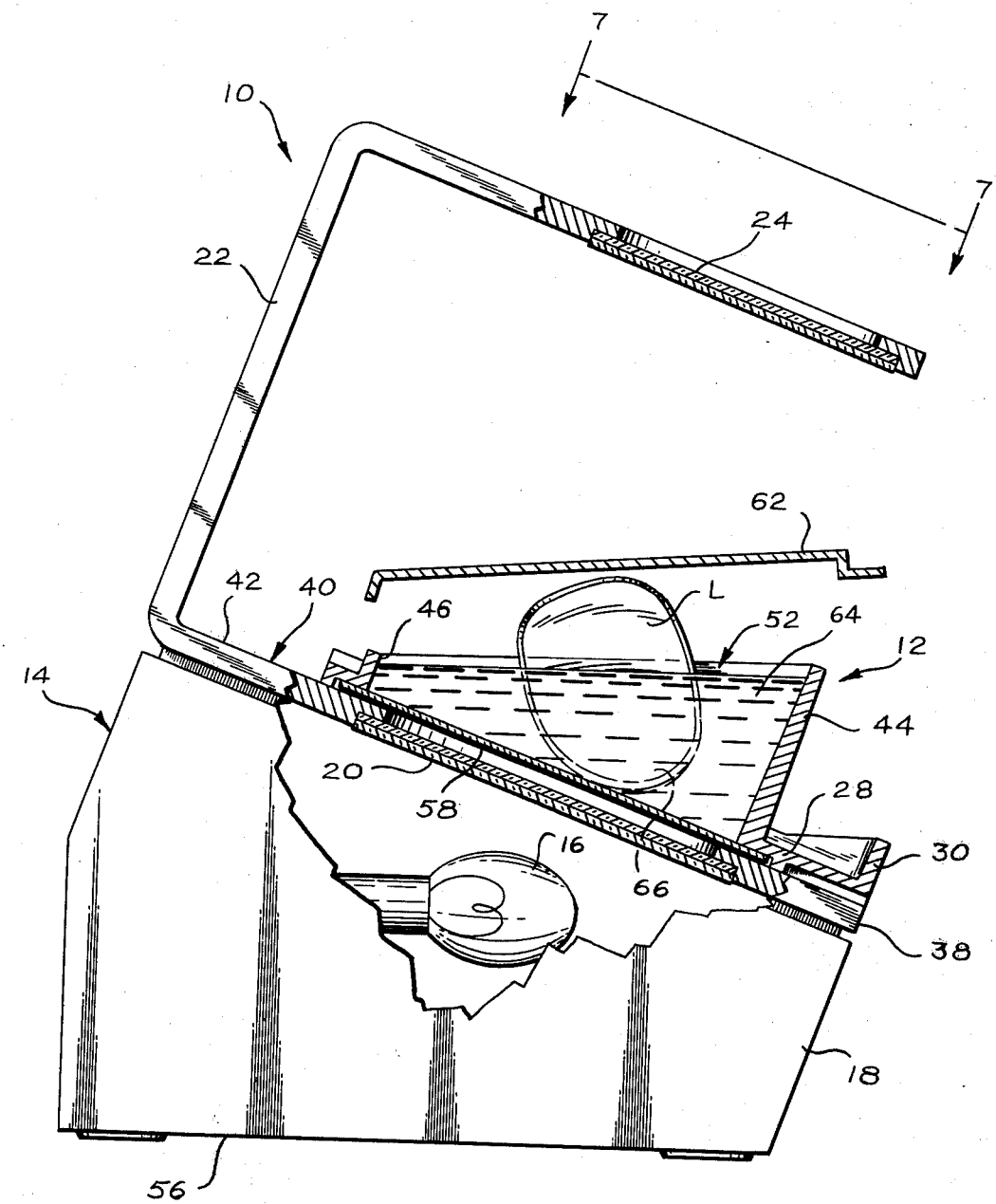
FIG. 4 is a side elevational view, partially in cross section, of the strain detector with the auxiliary device shown in a position of use thereupon.

In FIGS. 1 and 4 there is illustrated an exemplary commercially available light polarizing strain detector 10 to which an auxiliary liquid container device 12 (FIG. 2) of the present invention is adaptable as shown in FIG. 4 for rendering the strain detector 10 useful in inspecting glass ophthalmic lenses for the presence or absence of stress patterns resulting from ion exchange treatment.

Strain detector 10 conventionally comprises a main supporting structure 14 containing a source of light (lamp 16) within its base 18. Above lamp 16 is light polarizing plate 20 which, being linearly polarizing to light, transmits substantially only that light from lamp 16 which is polarized in a given single direction. An overhead arm 22 supports a second similar light polarizing plate 24 having its axis of polarization 24a orthogonal to the axis of polarization 20a of plate 20. Those seeking greater details of the aforesaid type of light polarizers may refer to U.S. Pat. Nos. 2,173,304 and 2,270,323.

Strain detector 10 is of a type conventionally used to identify heat-treated glass lenses and/or stresses in glazed glass or plastic lenses. This is possible because of the relatively high magnitude of radial and tangential stresses that are produced and exist in a thermally tempered glass lens or a lens under stress when glazed. However, because of the virtual absence of radial stresses in ion exchange treated lenses and only very thin layers of tangential stress, the detection of strengthening by ion exchange treatment in conventional strain detectors such as detector 10 cannot be readily or reliably accomplished. The magnitude of radial stress in ion exchange treated lenses is so low as to be substantially invisible even with the aid of a strain detector 10 and the dimensions of the tangential compression layers are so small as to be largely masked by edging (e.g. beveling) of the lens prior to its glazing.

It has been discovered, however, that immersion of an ion exchange treated lens in a liquid having a similar refractive index makes it possible to view, with the aid of a strain detector 10, the presence of tangential compression in the rim or edge of the lens. This technique of observing the tangential rim stress layer displays birefringence resulting from tangential compression to the exclusion of appreciable, if any, light scattering by diffusion or dispersion. Thus, identification of surface stresses in lenses produced by ion exchange treatment can be made.

The present invention provides liquid container 12 (FIG. 2) as an auxiliary device for detector 10 wherewith the immersion technique for detecting surface stress in ion exchange treated lenses may be readily and efficiently conducted. This, according to the invention, requires no alteration of the detector. Auxiliary device 12 comprises a main body member or frame 26 which may be injection molded, cast or otherwise formed into the integral configuration of a main supporting tray 28. Having a generally rectilinear configuration, tray 28 is tapered slightly convergently from its forward end 30 toward its rearward end 32 and is provided with a depending mounting flange 34 extending along each of its opposite sides. The resulting tapered channel 36 extending from front-to-back along the underside of tray 28 is so dimensioned as to match in size and taper the configuration of the foremost portion 38 of the table 40 of strain detector 10. Thus, auxiliary device 12 may be simply, securely and readily removably applied to table 40 as follows:

Channel 36 of device 12 is first placed against the rearward portin 42 of table 40. Thereafter, device 12 is slid along table 40 toward its forward portion 38 until reaching the position shown in FIG. 4. At that point, the tapered edges of table 40 and flanges 34 will come into firm intimate contact with each other and produce the desired releasable locking of auxiliary device 12 to strain detector 10.

Upstanding in tray 28 and intregal therewith are sidewalls 44, 46, 48 and 50 of a liquid receiving compartment 52. With rear wall 46 of compartment 52 of a height sufficient to contain an adequate minimum depth of fluid in compartment 52, the forward wall 44 and sidewalls 48, 50 are of such controlled height dimensions as to establish rim 54 having a disposition relative to tray 28 such that it will assume a substantially parallel relationship to bottom 56 of strain detector 10 when the auxiliary device 12 is installed as shown in FIG. 4.

The entire frame 26 which includes tray 28 and compartment walls 44, 46, 48 and 50 is preferably formed of an opaque or relatively dark acrylic resin, e.g. Plexiglass, so as to be minimally transmissive to light. The portion of tray 28 bounded by compartment walls 44, 46, 48 and 50, being open, is provided with a window 58 of clear, strain-free glass or plastic, e.g. an acrylic resin such as Plexiglass. Window 58 is preferably cast or similarly formed as a flat sheet so as to be strain free and otherwise optically inactive, i.e. non-diffusing to light and essentially non-birefringent.

Window 58 is heat sealed, cemented or otherwise affixed to the bottom of tray 28 in a manner effecting a liquid-tight seal with walls 44, 46, 48 and 50 of compartment 52. It thereby comprises the bottom of compartment 52. A cement composed of tetra-hydrl-flurane and Plexiglass mixed together in proportions providing the mixture with a suitable working viscosity can be used to seal window 58 in place.

The lateral extension of tray 28 around walls 44, 46, 48 and 50 of compartment 52 provides a drip or splash catcher section 60 wherewith undue contamination of strain detector 10 and the immediate environment of its use by liquid carried outwardly of compartment 52 is, for the most part, avoided.

A cover 62 constructed and arranged to fit over rim 54 of compartment 52 may be provided for protection against dust or other contamination of the liquid in the compartment 52 when the auxiliary device 12 is not in use.

With cover 62 removed from compartment 52 and the compartment at least partially filled with a liquid 64 (FIG. 4) having an index of refraction approximating that of a lens L to be inspected for strengthening by ion exchange treatment, the inspection may proceed as follows:

At least a substantial portion 66 of a lens L is immersed in liquid 64. Lamp 16 is energized and the immersed portion of lens L is viewed through light polarizing plate 24 from a suitable position thereabove, e.g. from a position between arrows 7—7 (FIG. 4). In so doing, observation of one or more bright bands of light appearing in liquid 64 as radiating from the edge of lens L will provide an indiction of the lens having been strengthened by ion exchange treatment (i.e. that the lens has a layer of tangential compression in its rim). The absence of such bright bands of light will indicate a lack of lens strengthening by ion exchange treatment.

While, as mentioned hereinabove, lens strengthening by heat treatment may be detected with the strain detector 10 alone (i.e. without auxiliary device 12), the device need not be removed from strain detector 10 when inspecting heat treated lenses. Both heat treated and ion exchange treated lenses can be inspected in device 12. Heat treated lenses will display the general configuration of a Maltese cross, or similar patterns and/or portions thereof, as already explained.

Figure 5:
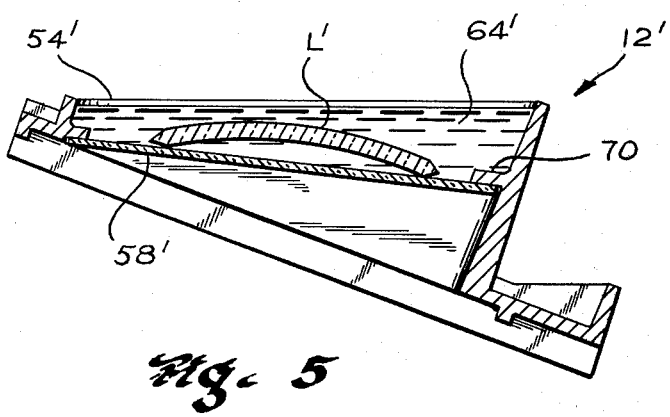
FIGS. 5 and 6 are cross-sectional views of modifications of the auxiliary device.
Figure 6:
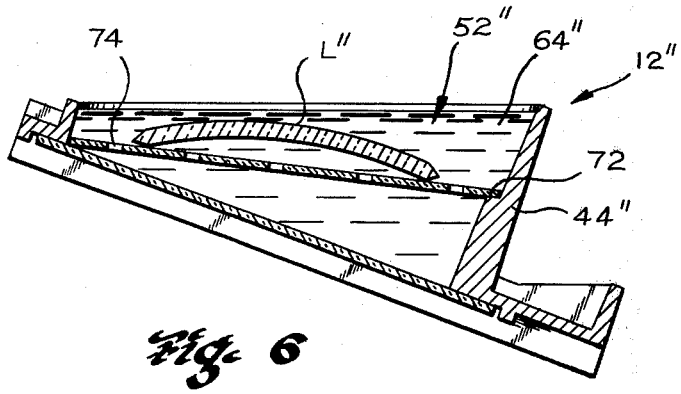
Figure 7:
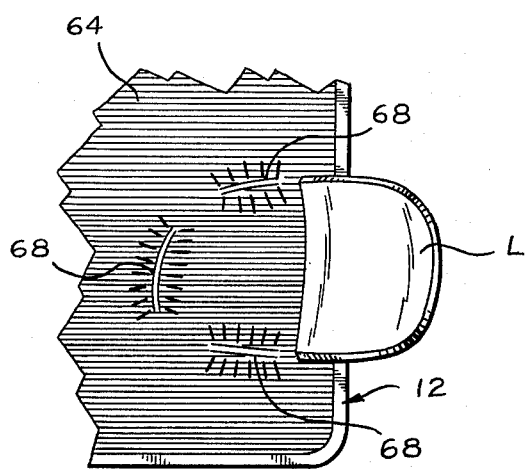
FIG. 7 is a fragmentary plan view of the auxiliary device shown in FIG. 4 with a lens depicted as it would appear when viewed through light polarizing means of the strain detector.

FIGS. 5 and 6 illustrate modifications of the invention wherewith it is rendered more convenient to completely immerse a lens to be inspected, if such technique is desired.

In the FIG. 5 embodiment of the invention, flange 70 is provided in liquid container device 12' so that transparent bottom window 58' may be disposed more nearly parallel to rim 54'. Thus, for complete immersion of a lens L', a less than usual amount and depth of liquid 64' may be used. This further facilitates removal of lens L' following inspection thereof.

In the FIG. 6 embodiment of the invention, shoulder 72 is provided internally of forward wall 44'' of auxilliary device 12'' with all remaining portions of device 12'' remaining substantially identical to those of the embodiment of device 12 already described. Shoulder 72 allows a plate 74, preferably formed of a material and in a manner identical to that described relative to window 58 to be placed internally of compartment 52'' so as to facilitate, by minimal depth of immersion, the removal of lens L'' after inspection in liquid 64''. Plate 74 may be perforated to allow liquid 64'' to freely flow therethrough.

For those interested in types of liquids which may be used to perform the above-described inspection of lenses, any one of the following will provide satisfactory results when inspecting lenses of ophthalmic crown glass having a refractive index of approximately 1.523: glycerin; aniline; benzene; pyridine; chlorobenzene; trimethylene bromide; pentachloroethene; ortho-nitrotoluene; dipropylene glycol dibenzorate; xylol; cedar oil; mixtures of ethylene, bromide and chlorobenzene; and kerosene. It is desirable, however, to select a water soluble liquid when possible so as to facilitate cleaning of the lenses after immersion and inspection.

We claim:

1. An auxiliary device for adapting a strain detector to use in inspecting ion exchange treated lenses by immersion of the lenses in liquid of approximately matching refractive index; the device comprising:
    a one-piece main body component having a tray section, a depending flange along each side of said tray section forming a mounting channel thereunder for releasably fitting said device to a strain detector;
    a liquid compartment having sidewalls upstanding in said tray section inwardly of edges thereof; and
    a separate substantially strain-free highly transparent window forming the bottom of said compartment, said window being peripherally sealed to said main body component adjacent said sidewalls.

2. An auxiliary device according to claim 1 wherein said tray section and walls of said upstanding liquid compartment are substantially opaque.

3. An auxiliary device according to claim 1 further including a removable dust cover for said compartment.

4. An auxiliary device for adapting a strain detector to use in inspecting ion-exchange treated lenses by immersion of the lenses in a liquid of approximately matching refractive index, the device comprising:
    a main body component having a tray section, a depending flange along each side of said tray section forming a mounting channel thereunder for releasably fitting said device to a strain detector;
    a liquid compartment upstanding in said tray section, said compartment having front, back and side walls of differing height dimensions providing a rim about said compartment which is disposed in a plane having an acute angular disposition to said tray section; and
    a transparent window forming the bottom of said compartment.

5. An auxiliary device according to claim 4 wherein said tray section has upstanding sidewalls extending peripherally about at least the three sides thereof adjacent said front and sidewalls of said compartment for collecting liquid carried over sides of said compartment when said auxiliary device is in use.

6. An auxiliary device according to claim 4 wherein said transparent window is disposed in approximately parallel relationship to said rim of said compartment.

7. An auxiliary device according to claim 4 wherein said transparent window is disposed in a substantially parallel relationship to said tray section.

8. An auxiliary device according to claim 7 further including an accessory plate within said liquid compartment disposed in a plane approximately parallel to said rim of said compartment.

9. An auxiliary device according to claim 8 wherein said plate is at least partially foraminate.

* * * * *